United States Patent
Stählin et al.

(10) Patent No.: US 9,272,585 B2
(45) Date of Patent: Mar. 1, 2016

(54) METHOD FOR FILTERING DATA IN A TIRE PRESSURE MONITORING SYSTEM FOR A VEHICLE

(75) Inventors: Ulrich Stählin, Eschborn (DE); Klaus Rink, Rodenbach (DE); Stefan Günthner, Frankfurt am Main (DE); Bernhard Schmid, Friedberg (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/344,009

(22) PCT Filed: Sep. 12, 2012

(86) PCT No.: PCT/EP2012/067855
§ 371 (c)(1),
(2), (4) Date: May 23, 2014

(87) PCT Pub. No.: WO2013/037835
PCT Pub. Date: Mar. 21, 2013

(65) Prior Publication Data
US 2014/0327535 A1    Nov. 6, 2014

(30) Foreign Application Priority Data
Sep. 12, 2011   (DE) .......................... 10 2011 082 528

(51) Int. Cl.
*B60C 23/00* (2006.01)
*B60C 23/02* (2006.01)
*B60C 23/04* (2006.01)
(Continued)

(52) U.S. Cl.
CPC ............. *B60C 23/02* (2013.01); *B60C 23/0408* (2013.01); *B60C 23/0474* (2013.01); *B60C 23/061* (2013.01); *G01C 21/12* (2013.01)

(58) Field of Classification Search
CPC .. B60C 23/0408; B60C 23/04; B60C 23/0416
USPC ........................................................ 340/442
See application file for complete search history.

(56) References Cited

U.S. PATENT DOCUMENTS

2004/0246115 A1   12/2004  Ogawa
2008/0086248 A1*  4/2008  Lu ........................ G05D 1/0891
                                                   701/41

(Continued)

FOREIGN PATENT DOCUMENTS

CN        1951713 A     4/2007
CN        201096879 Y   8/2008
(Continued)

OTHER PUBLICATIONS

PCT International Search Report—Oct. 18, 2012.
German Examination Report—Apr. 30, 2013.

*Primary Examiner* — Jack K Wang
(74) *Attorney, Agent, or Firm* — Brinks Gilson & Lione

(57) ABSTRACT

A method for filtering data in a tire pressure monitoring system for a vehicle includes the steps of: recording a variable that is dependent on the tire radius for a wheel of the vehicle, and filtering the variable that is dependent on the tire radius on the basis of driving dynamics data and/or a global navigation satellite system signal, called GNSS signal below. A vehicle control system and a vehicle having the control system are also described.

10 Claims, 2 Drawing Sheets

(51) Int. Cl.
*B60C 23/06* (2006.01)
*G01C 21/12* (2006.01)
*B60Q 1/00* (2006.01)
*G01M 17/00* (2006.01)

(56) References Cited

U.S. PATENT DOCUMENTS

2010/0164704 A1* 7/2010 Lindskog .............. B60C 23/062
340/442
2011/0257882 A1* 10/2011 McBurney ............. G01C 21/30
701/532

FOREIGN PATENT DOCUMENTS

| CN | 101477136 A | 7/2009 |
| CN | 101606080 A | 12/2009 |
| DE | 43 31 845 A1 | 4/1994 |
| DE | 10 2004 018 629 A1 | 11/2004 |
| DE | 10 2008 049 047 A1 | 4/2010 |
| DE | 10 2009 036 493 A1 | 2/2011 |
| DE | 10 2010 006 178 A1 | 8/2011 |
| EP | 1 752 317 A2 | 2/2007 |
| JP | 2008-168674 | 7/2008 |

* cited by examiner

METHOD FOR FILTERING DATA IN A TIRE PRESSURE MONITORING SYSTEM FOR A VEHICLE

CROSS REFERENCE TO RELATED APPLICATIONS

This application claims priority to German Patent Application Nos. 10 2011 082 528.2, filed Sep. 12, 2011 and PCT/EP2012/067855, filed Sep. 12, 2012.

FIELD OF THE INVENTION

The invention relates to a method for filtering data in a tire pressure monitoring system for a vehicle, to a control apparatus for carrying out the method and to a vehicle having the control apparatus.

BACKGROUND

DE 10 2009 036 493 A1 discloses the practice of determining the tire pressure of a wheel of a vehicle on the basis of a comparison of a vehicle longitudinal speed with the individual wheel rotational speeds and therefore of monitoring the tire pressure of the wheel.

The object is to improve tire pressure monitoring.

The object is achieved by means of the features described herein.

SUMMARY AND INTRODUCTORY DESCRIPTION OF THE INVENTION

According to one aspect of the invention, a method for filtering data in a tire pressure monitoring system for a vehicle includes the steps of:
  recording a variable that is dependent on the tire radius for a wheel of the vehicle, and
  filtering the variable that is dependent on the tire radius on the basis of driving dynamics data and/or a global navigation satellite system signal, called GNSS signal below.

The variable that is dependent on the tire radius may be the tire radius itself, the tire pressure or any other desired variable, on the basis of which the tire radius can be determined. Furthermore, the driving dynamics data may include all variables which describe the movement of the vehicle in space. These variables may be inertial sensor data and therefore vehicle longitudinal dynamics and wheel speeds.

The stated method is based on the consideration that, in order to record the tire pressure when determining the tire radius, the vehicle longitudinal speed can be determined from the wheel speed sensors themselves. Furthermore, the stated method is based on the consideration that the vehicle longitudinal speed can also be determined from other driving dynamics data, such as an inertial sensor which measures the vehicle longitudinal dynamics. The vehicle longitudinal speed is therefore present at least twice in the vehicle.

However, it is recognized, within the scope of the stated method, that a true reference speed is not available either when determining the vehicle longitudinal speed on the basis of the wheel speeds or when determining the vehicle longitudinal speed on the basis of the vehicle longitudinal dynamics from the inertial sensor data, which noticeably reduces the quality of the tire radius determined in this manner.

The idea of the stated method is therefore to increase the quality of the tire radius by determining the tire radius from two different measurement principles and then comparing them during filtering. This makes it possible to detect differences, such as errors and noise, which can be used to correct the tire radius measured in future.

In this case, filtering is intended to include any desired analog or digital signal processing measure which can be used to compare the two types of data in order to increase their information content. In this case, pure averaging can be carried out without further consideration of other factors such as noise. If the noise is intended to be concomitantly considered, a state observer or a Kalman filter would come into consideration as the filter. If the form of noise is also intended to be considered, a particle filter could possibly be used, which particle filter has a basic set of available noise scenarios and selects the noise scenario to be taken into account during elimination, for example by means of a Monte Carlo simulation.

In one development of the stated method, the variable that is dependent on the tire radius is recorded on the basis of an item of pressure information recorded by a pressure sensor fastened to the wheel of the vehicle. This development is based on the consideration that other sensor variables, for example position data relating to the vehicle, could also be filtered in the abovementioned manner in a vehicle. For example, the position of the vehicle could be detected on the basis of a navigation system signal yet to be described and could be corrected on the basis of an inertial sensor which describes the dynamics of the vehicle in the different spatial directions. In this manner, the position of the vehicle could be stated with respect to the exact lane. However, the higher the information content of the data from the inertial sensor, the better errors can be removed from the navigation system signal. On the basis of this knowledge, the development within the scope of this example proposes improving the information content of the data from the inertial sensor first of all using the pressure sensor since a common comparison variable, the tire pressure, can be calculated using both sensors (inertial sensor and pressure sensor). The data whose information content has been increased in this manner could then be used to increase the information content of the navigation system signal.

In another development of the stated method, the vehicle has at least two wheels and the variable that is dependent on the tire radius is calculated on the basis of wheel speeds of the two wheels and a vehicle longitudinal speed. This development is based on the consideration that the tire radius and therefore the tire pressure can fundamentally be measured on the basis of a single sensor system, the wheel speed sensors.

In one development of the present invention, the stated method includes the step of:
  recording the vehicle longitudinal speed on the basis of inertial sensor data.

This development is based on the consideration that, as already mentioned, the vehicle longitudinal speed would be present twice, with the result that, in order to increase the information content, it would suffice to filter the vehicle longitudinal speed as the variable that is dependent on the tire radius. In this manner, the filtering could be carried out without further downstream computing steps, which would show a noticeable gain in computing power in iterative filtering.

In an additional development, the stated method includes the step of:
  detecting a position of the vehicle from the GNSS signal, and
  recording the vehicle longitudinal speed on the basis of the detected position of the vehicle.

A global positioning system signal (GPS signal for short), a global navigation satellite system signal (GLONASS signal for short) or a Galileo signal, for example, can be used as the GNSS signal. An alternative or additional comparison variable would therefore be available for the vehicle longitudinal speed, on the basis of which comparison variable the information content of the tire radius to be recorded could be improved.

In yet another development of the present invention, the stated method includes the step of:

recording the vehicle longitudinal speed on the basis of a carrier frequency of the GNSS signal.

This development is based on the consideration that the carrier frequency is distorted by the Doppler effect as a result of movement of the vehicle when receiving the GNSS signal in the vehicle. This distortion of the carrier frequency can be used as an additional redundant source for the vehicle longitudinal speed.

According to another aspect of the invention, a control apparatus is set up to carry out a stated method.

In one development of the stated control apparatus which in this invention is, the stated apparatus has a memory and a processor. In this case, the stated method is stored in the memory in the form of a computer program and the processor is provided for the purpose of carrying out the method when the computer program is loaded from the memory into the processor.

According to another aspect of the invention, a computer program includes program code means for carrying out all of the steps of one of the stated methods when the computer program is executed on a computer or on one of the stated apparatuses.

According to another aspect of the invention, a computer program product contains a program code which is stored on a computer-readable data storage medium and carries out one of the stated methods when executed on a data processing device.

According to another aspect of the invention, a vehicle includes a stated control apparatus.

BRIEF DESCRIPTION OF THE DRAWINGS

The above-described properties, features and advantages of this invention and the manner in which they are achieved become clearer and more easily comprehensible in connection with the following description of the exemplary embodiments which are explained in more detail in connection with the drawings, in which.

In the figures, identical technical elements are provided with identical reference symbols and are described only once.

FURTHER DETAILED DESCRIPTION OF THE INVENTION

Figure 1:
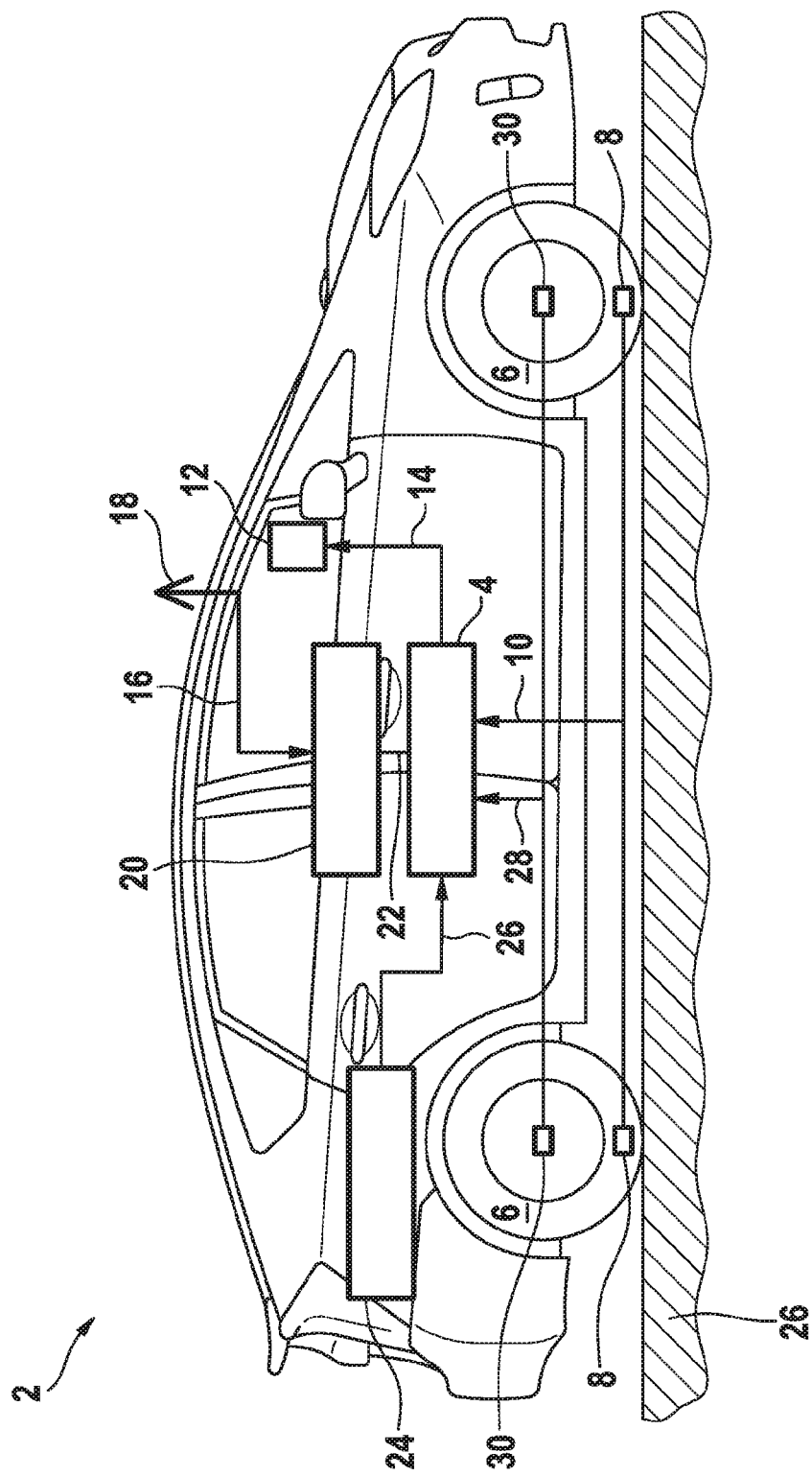
FIG. 1 shows a basic illustration of a vehicle having a fusion sensor.

Reference is made to FIG. 1 which shows a basic illustration of a vehicle 2 having a fusion sensor 4.

In the present embodiment, the fusion sensor 4 in the vehicle 2 receives a tire pressure 10 from a tire pressure sensor 8 on each wheel 6 of the vehicle 2, on the basis of which the tire pressure 10 is intended to be monitored. The fusion sensor 4 receives this tire pressure 10 and monitors the latter in a manner known to a person skilled in the art.

In the present embodiment, the vehicle 2 includes a navigation device 12 which can display a map containing the position of the vehicle 2 on the map to the driver. For this purpose, the navigation device 12 receives position data 14 from the fusion sensor 4.

The fusion sensor 4 generates these position data 14 on the basis of a GNSS signal 16 which is received at a GNSS receiver 20 via a GNSS antenna 18. On the basis of the GNSS signal 16, the GNSS receiver 20 outputs GNSS raw data 22 which are then converted into the position data 14 in the fusion sensor 4.

Although the raw data 22 suffice to generate the position data 14, the fusion sensor 4 is designed, in a manner yet to be described, to increase the information content of the position data 14 which can be generated. This is necessary, on the one hand, since the GNSS signal 16 may have a very high signal-to-noise ratio and may thus be very inaccurate. On the other hand, the GNSS signal 16 is not constantly available.

In the present embodiment, the vehicle 2 has an inertial sensor 24 for this purpose which records inertial sensor data 26 relating to the vehicle 2. These are known to include a longitudinal acceleration, a lateral acceleration and a vertical acceleration and a roll rate, a pitch rate and a yaw rate of the vehicle 2 or subsets of these variables. In the present embodiment, these inertial sensor data 26 are used to increase the information content of the position data 22 and to specify the position of the vehicle 2 on the road 26. The position data 14 specified in this manner can then be used by the navigation device 12 itself when the GNSS signal 16 is not available at all, for example in a tunnel.

In order to further increase the information content of the position data 14, wheel speeds 28 which are recorded from the wheels 6 of the vehicle 2 using wheel speed sensors 30 are also used in the present embodiment.

Figure 2:
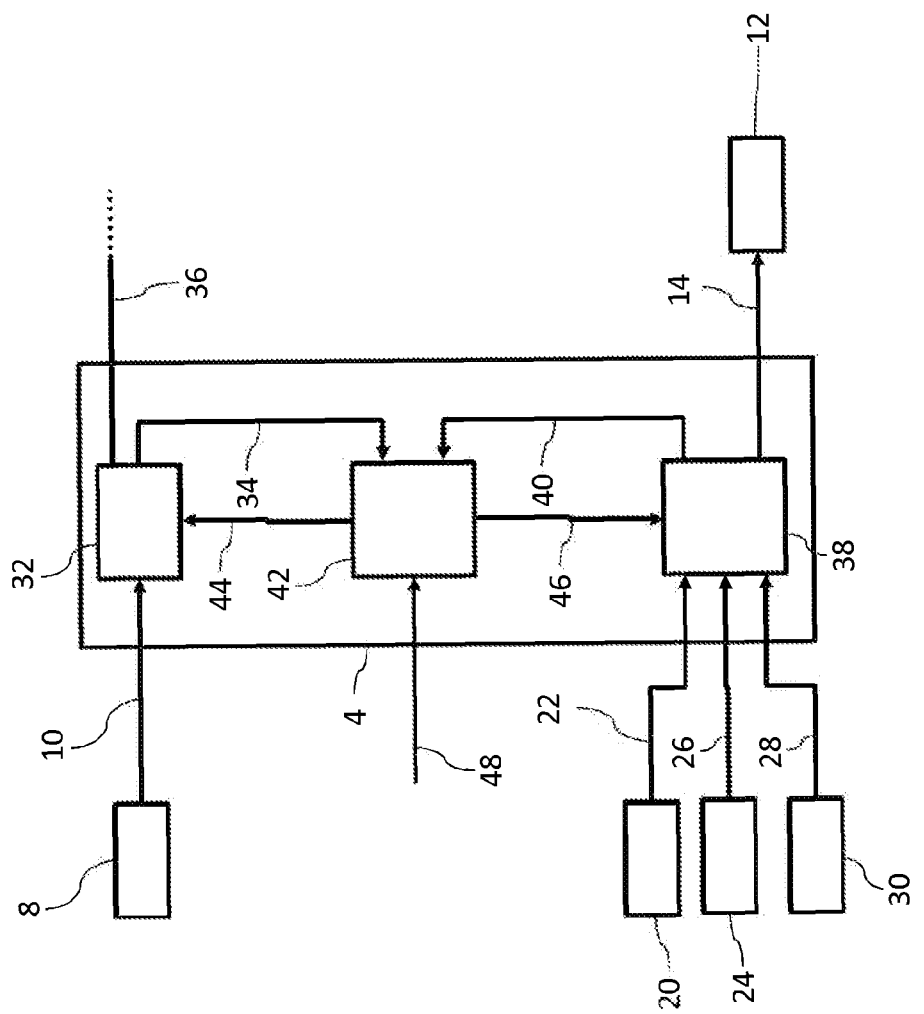
FIG. 2 shows a basic illustration of the fusion sensor from FIG. 1.

Reference is made to FIG. 2 which shows a basic illustration of the fusion sensor 4 from FIG. 1.

The measurement data already mentioned in FIG. 1 enter the fusion sensor 4. The fusion sensor 4 is intended, on the one hand, to output position data 14 and, on the other hand, the fusion sensor 4 is intended to monitor the tire pressure 10 of at least one wheel 6 of the vehicle 2 on the basis of its tire radius 34 using a tire pressure monitoring system 32. The tire pressure monitoring system 32 is intended to output a corresponding warning signal 36 in the event of an excessively low tire pressure 10 and therefore in the event of an excessively low tire radius 34.

The basic idea is to compare the information from the tire pressure monitoring system 32, the GNSS raw data 22 from the GNSS receiver 20, the inertial sensor data 26 from the inertial sensor 24 and the wheel speeds 28 from the wheel speed sensors 30 and to increase a signal-to-noise ratio in the tire radius 34 and therefore in the tire pressure 10 from the tire pressure sensor 6. In the present embodiment, tire radii are compared in order to increase the signal-to-noise ratio of the measured tire pressure 10. However, this is only exemplary. In principle, any desired variable that is dependent on the tire pressure 10 can be compared in the fusion sensor 4, with the result that a redundant variable is recorded in the vehicle 2. Such an alternative redundant variable would be the longitudinal speed of the vehicle 2 which could be derived from the tire pressure 10 using the known wheel speeds 28. However, this embodiment is not described any further for the sake of brevity.

For the purpose of comparison, a comparison radius 40 is calculated for the tire radius 34 from the GNSS raw data 22, the inertial sensor data 26 and the wheel speeds 28 in a model 38. The model 28 can be constructed in a similar manner to the fusion sensor 4 and can filter the GNSS raw data 22, the inertial sensor data 26 and the wheel speeds 28 with respect to one another again in a similar manner in order to have input data available for calculating the comparison radius 40, which input data have a higher information content. The model 38 may therefore be a fusion sensor, for example, in which the position data 14 are filtered from the GNSS raw data 22 on the basis of the inertial sensor data 26.

The comparison itself is carried out in a filter 42 which may indeed have any desired design, but a Kalman filter tackles the comparison most effectively with a comparatively low demand on computing resources. Therefore, the filter 30 is preferably intended to be a Kalman filter 30 below.

On the basis of the tire radius 34 and the comparison radius 40, the Kalman filter 30 calculates an error budget 44 for the tire radius 34 and an error budget 46 for the comparison radius 40. In the text below, an error budget is intended to be understood as meaning an overall error in a signal which is composed of different individual errors when recording and transmitting the signal.

Explained using the example of the GNSS signal 22 and the position data 14, a corresponding error budget may be composed of errors from the satellite orbit, the satellite clock, the residual refraction effects and from errors in the GNSS receiver 20. The error budget of a signal may include the deviation from the expected value of the signal and the variance of the signal.

The error budget 44 of the tire radius 34 and the error budget 46 of the comparison radius 40 are then accordingly supplied to the tire monitoring system 32 and to the model 38 for correcting the tire radius 34 and the comparison radius 40, respectively. That is to say the tire radius 34 and the comparison radius 40 are iteratively corrected by their errors.

In the present embodiment, in a similar manner to the model 38, a further fusion sensor could likewise be overlaid on the fusion sensor 4, which further fusion sensor then outputs a further error budget 48, for example of the position signal 14 or of the warning signal 36. This further error budget 48 could be supplied to the Kalman filter 42 and could be taken into account in this filter in a manner known to a person skilled in the art when generating the error budgets 44, 46.

While the above description constitutes the preferred embodiment of the present invention, it will be appreciated that the invention is susceptible to modification, variation and change without departing from the proper scope and fair meaning of the accompanying claims.

The invention claimed is:

1. A method for filtering data in a tire pressure monitoring system for a vehicle, comprising the steps of:
    recording a variable that is dependent on the tire radius for a wheel of the vehicle,
    filtering the variable that is dependent on the tire radius on the basis of at least one of driving dynamics data and a global navigation satellite system signal, and
    comparing the information from the tire pressure monitoring system, global navigation satellite system raw data from a global navigation satellite system receiver, inertial sensor data from an inertial sensor and wheel speeds from wheel speed sensors to increase a signal-to-noise ratio in the tire radius and a pressure from a tire pressure.

2. The method as claimed in claim 1, further comprising wherein the variable that is dependent on the tire radius is recorded on the basis of an item of pressure information recorded by a pressure sensor fastened to the wheel of the vehicle.

3. The method as claimed in claim 2, further comprising wherein the pressure information is converted into a longitudinal speed of the vehicle using a wheel speed of the wheel.

4. The method as claimed in claim 1 further comprising wherein providing the vehicle with at least two wheels and the variable that is dependent on the tire radius is calculated on the basis of wheel speeds of the two wheels and a vehicle longitudinal speed.

5. The method as claimed in claim 4 further comprising the step of: recording the vehicle longitudinal speed on the basis of inertial sensor data.

6. The method as claimed in claim 4 further comprising the steps of: detecting a position of the vehicle from the global navigation satellite system signal, and recording the vehicle longitudinal speed on the basis of the detected position of the vehicle.

7. The method as claimed in claim 4 further comprising the step of: recording the vehicle longitudinal speed on the basis of a carrier frequency of the global navigation positioning satellite system signal.

8. A control apparatus which is configured to carry out a method of recording a variable that is dependent on the tire radius for a wheel of the vehicle, and filtering the variable that is dependent on the tire radius on the basis of at least one of driving dynamics data and a global navigation satellite system signal, and comparing the information from the tire pressure monitoring system, global navigation satellite system raw data from a global navigation satellite system receiver, inertial sensor data from an inertial sensor and wheel speeds from wheel speed sensors to increase a signal-to-noise ratio in the tire radius and a pressure from a tire pressure.

9. A computer program product comprising a program code which is stored on a computer-readable non-transitory data storage medium and carries out a method when executed on a data processing device, the method including recording a variable that is dependent on the tire radius for a wheel of the vehicle, filtering the variable that is dependent on the tire radius on the basis of at least one of driving dynamics data and a global navigation satellite system signal, and comparing the information from the tire pressure monitoring system, global navigation satellite system raw data from a global navigation satellite system receiver, inertial sensor data from an inertial sensor and wheel speeds from wheel speed sensors to increase a signal-to-noise ratio in the tire radius and a pressure from a tire pressure.

10. A vehicle comprising a control apparatus for recording a variable that is dependent on the tire radius for a wheel of the vehicle, and filtering the variable that is dependent on the tire radius on the basis of at least one of driving dynamics data and a global navigation satellite system signal, and comparing the information from the tire pressure monitoring system, global navigation satellite system raw data from a global navigation satellite system receiver, inertial sensor data from an inertial sensor and wheel speeds from wheel speed sensors to increase a signal-to-noise ratio in the tire radius and a pressure from a tire pressure.

* * * * *